United States Statutory Invention Registration [19]

[11] Reg. Number: H124

Antonuzzi et al. [45] Published: Sep. 2, 1986

[54] INITIATOR ASSEMBLY

[75] Inventors: Anthony P. Antonuzzi, Stoneham; William E. Hagel, Billerica; Donald M. Lawson, Lexington, all of Mass.; Richard S. Herman, Clifton, N.J.

[73] Assignee: The United States of America as represented by the Secretary of the Army, Washington, D.C.

[21] Appl. No.: 835,855

[22] Filed: Feb. 10, 1986

[51] Int. Cl.[4] ..... F42C 15/18

[52] U.S. Cl. ..... 102/254; 102/247; 102/252; 102/272; 102/274

*Primary Examiner*—David H. Brown

*Attorney, Agent, or Firm*—Anthony T. Lane; Harold H. Card, Jr.; Michael C. Sachs

[57] ABSTRACT

There is disclosed an initiator assembly for a ballistic missile system to effect fluid flow of a gas from a source thereof to user equipment disposed in a housing therefor including gas inlet and outlet conduits and comprised of a rotor member journalled for rotation in the housing and formed with a mass of an eccentric weight distribution with respect to the axis of rotation and wherein the rotor is provided with an explosive assembly ignited by a striker assembly activated by launch acceleration of the missile and wherein a drive piston of the explosive assembly fractures a closure element disposed in one of said gas conduits.

10 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INITIATOR ASSEMBLY

GOVERNMENTAL INTEREST

The United States Government has rights in this invention pursuant to contract number DAAK-10-82-C-0315 awarded by the Department of the Army.

BACKGROUND AND FIELD OF THE INVENTION

This invention relates to an initiator assembly, and more particularly to an initiator assembly for a ballistic missile assembly.

In many weapon systems there are provided safety features including assemblies for the prevention of arming of a weapon until after launching of the weapon from the deploying vessel thereby to minimize potentially dangerous results during handling and loading activities prior to launch. For example, the warhead of a torpedo is not armed, that is, placed in a condition for detonation upon impact, until after launch and substantial running time from the launching submarine. Similarly, an aerial bomb is not armed until release and significant free fall.

While arming of the missile is an included safety feature, the missile may also be equipped with other in-flight devices, e.g. navigational aids requiring energy sources for activation and operation after launching of such missile to completion of missile function. The in-flight devices may be placed in operational condition with electrical energy sources by electro-mechanical post-launching devices, or other energy sources. Electro-mechanical post-launching devices may become disabled prior to launch of the missile wherein the missile is subjected to a thermal event which disables the electro-mechanical arming device, but which is ineffective to disable missile capabilities.

SUMMARY OF THE INVENTION

The objects of the present invention are achieved by an initiator assembly for a ballistic missile system to effect fluid flow of a gas from a source thereof to user equipment disposed in a housing therefor including gas inlet and outlet conduits and comprised of a rotor member journalled for rotation in the housing and formed with a mass of an eccentric weight distribution with respect to the axis of rotation and wherein the rotor is provided with an explosive assembly ignited by a striker assembly activiated by launch acceleration of the missile and wherein a drive piston of the explosive assembly fractures a closure element disposed in one of said gas conduits.

OBJECTS OF THE INVENTION

Accordingly, an object of the present invention is to provide a novel post-launch activating assembly for a missile system.

Another object of the present invention is to provide a novel post-launch activating assembly for a missile system obviating electrical and/or electro-mechanical requirements.

Still another object of the present invention is to provide a novel post-launch activating assembly for a missile system of total reliability.

BRIEF DESCRIPTION OF THE DRAWINGS

Further objects and advantages of the present invention will become more apparent from the following detailed description thereof when taken with the accompanying drawings, wherein.

DETAILED DESCRIPTION OF THE INVENTION

Figure 1:
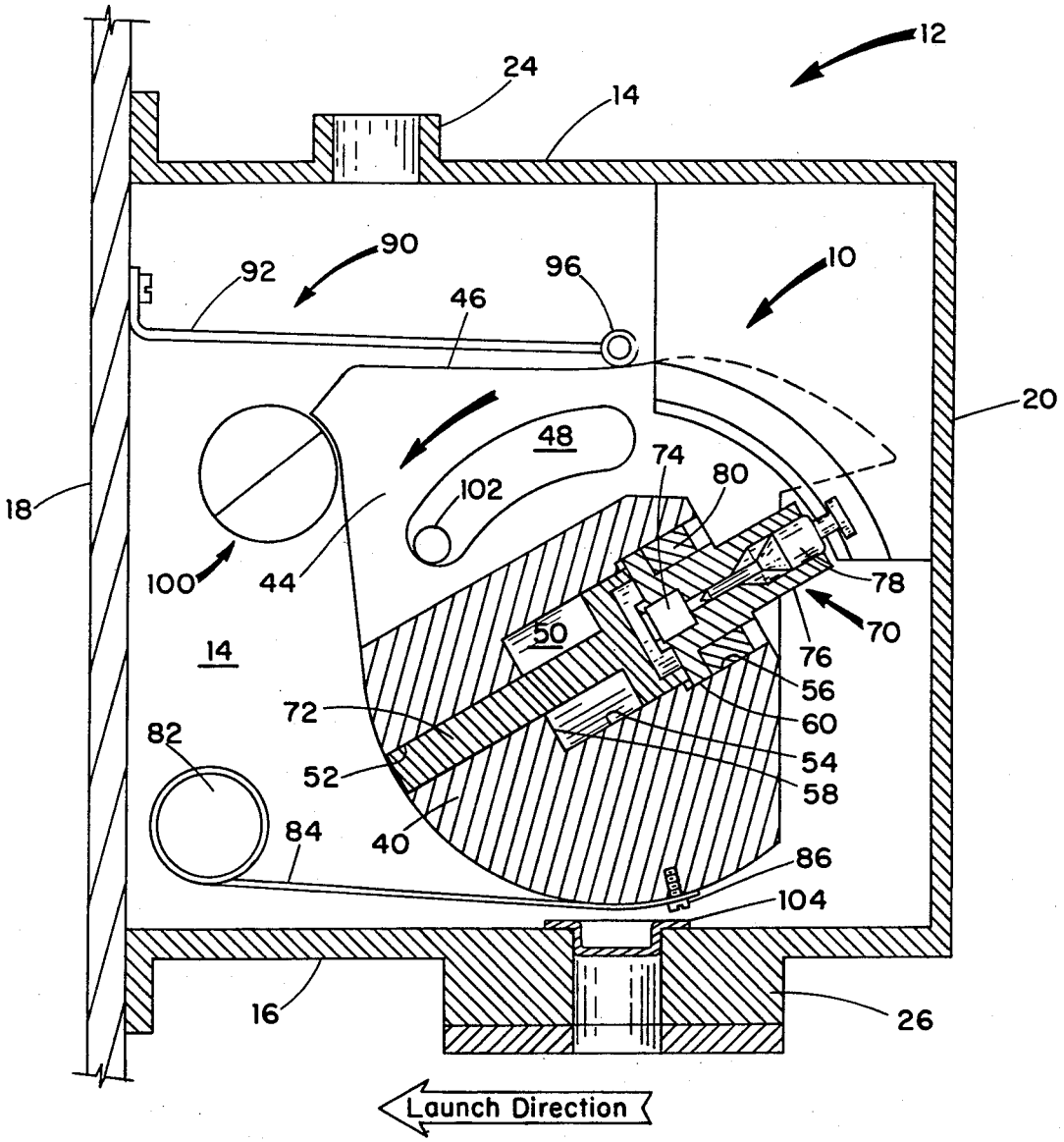
FIG. 1 is a schematic cross-sectional view of a portion of the housing assemly for the initiator assembly of the present invention.

Referring now to the drawings, there is illustrated an initiator assembly, generally indicated as 10, positioned within a housing 12 therefor as part of a ballistic missile system (not shown).

Figure 2:
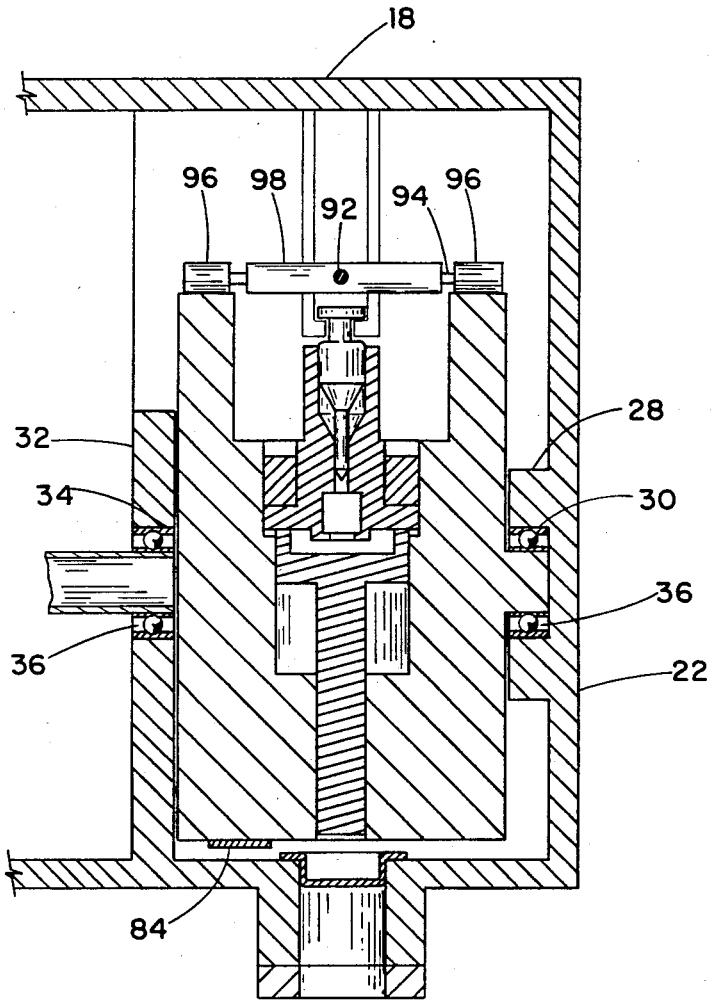
FIG. 2 is a top view thereof.

The housing 12 is comprised of top and bottom walls 14 and 16, end walls 18 and 20, and side wall 22. The top wall 14 is provided with a gas outlet conduit 24 in fluid communication with gas operated equipment (not shown). The bottom wall 16 is formed with a gas inlet conduit 26 in fluid communication with a source of compressed gas (not shown). The end wall 22 is formed with a boss portion 28 provided with a cylindrically-shaped channel 30, referring particularly to FIG. 2. The housing 12 is provided with an intermediate side wall member 32 formed with a cylindrically-shaped channel 34 in co-axial alignment with the channel 30 in the boss portion 28 of the side wall 22. Each of the channels 30 and 34 are provided with ball bearing members 36.

The initiator assembly 10 is comprised of a generally rotor member 40 formed with trunnion members 42 disposed within the bearing members 36 to permit rotation of the rotor member 40 with respect to the housing member 12 as more fully hereinafter described. The rotor member 40, referring particularly to FIG. 1, is formed with outwardly-extending and parallelly-disposed eccentric wall portions 44, each including an upper arc-shaped cam surface portion 46. The rotor member 40 is formed with a center of gravity eccentric with respect to the axis of rotation thereof. Each of the wall portions 44 of the rotor member 40 are provided with arcuate-shaped openings 48.

Centrally-disposed through the rotor member 40 and in a plane perpendicular to the axis of rotation thereof equidistant between the trunnion members 42, there is formed a chamber 50 defined by cylindrically-shaped surfaces 52, 54, and 56 (from left to right) of increasing diameter defining shoulder portions 58 and 60, respectively, referring particularly to FIG. 1. Within the chamber 50 of the rotor member 40, there is positioned on the shoulder portion 60 thereof, an explosive assembly, generally indicated as 70, and comprised of a drive piston 72, a stab primer 74, a firing pin guide 76, and firing pin member 78 mounted therein by a bushing member 80.

In the housing 12, there is disposed a spring housing member 82 for positioning a strip spring member 84 with one end thereof affixed to the spring housing member 82 and the other end fixed, for example, by threaded screw 86 to the rotor member 40. The spring member is under spring force to maintain the rotor member 40 within the housing 12 in the stored position as indicated in FIG. 1, and to permit movement of the rotor member 40 upon missile launch as more fully hereinafter discussed. The initiator assembly includes a striker assembly, generally indicated as 90, and comprised of a spring arm member 92 provided with an arm member 94 mounted perpendicularly thereto wherein the spring member is mounted to the end wall 18 of the housing 12 extending outwardly proximate the upper cam surfaces 46 of the wall portions 44 of the rotor member 40. The arm member 94 is provided with roller members 96 for contacting the cam surfaces 46 of the wall portions 44. Intermediate the roller member 96, there is provided a striker member 98 mounted on the arm member 94 of the striker assembly 90.

Upon positioning of the initiator assembly 10 within the housing member 12, a lower surface portion of the wall portions 44 is caused to contact a safety locking bar 100 extending into the housing 12 to prevent inadvertent rotation of the rotor member 40 prior to launch. Within the arcuate-shaped openings 48 formed with the wall portions 44 of the rotor member 40, there is disposed a limiting bar member 102.

The initiator assembly 10, as hereinabove discussed, is an element of a missile system to be actuate upon launch of the missile and to provide a motive fluid to user equipment. The initiator assembly 10 is disposed in the housing 12 within the missile system became operative upon launching of the missile. Upon launching of the missile, the safety locking bar 100 is withdrawn from contacting relationship with the wall portions 44 of the rotor member 40 thereby permitting the rotor member 40 to rotate in a counterclockwise direction, as indicated by the arrow against the spring tension of spring member 82 as a result of the eccentric weight of the rotor member 40 with respect to missile launch acceleration and the axis of rotation of the rotor member 40.

Figure 3:
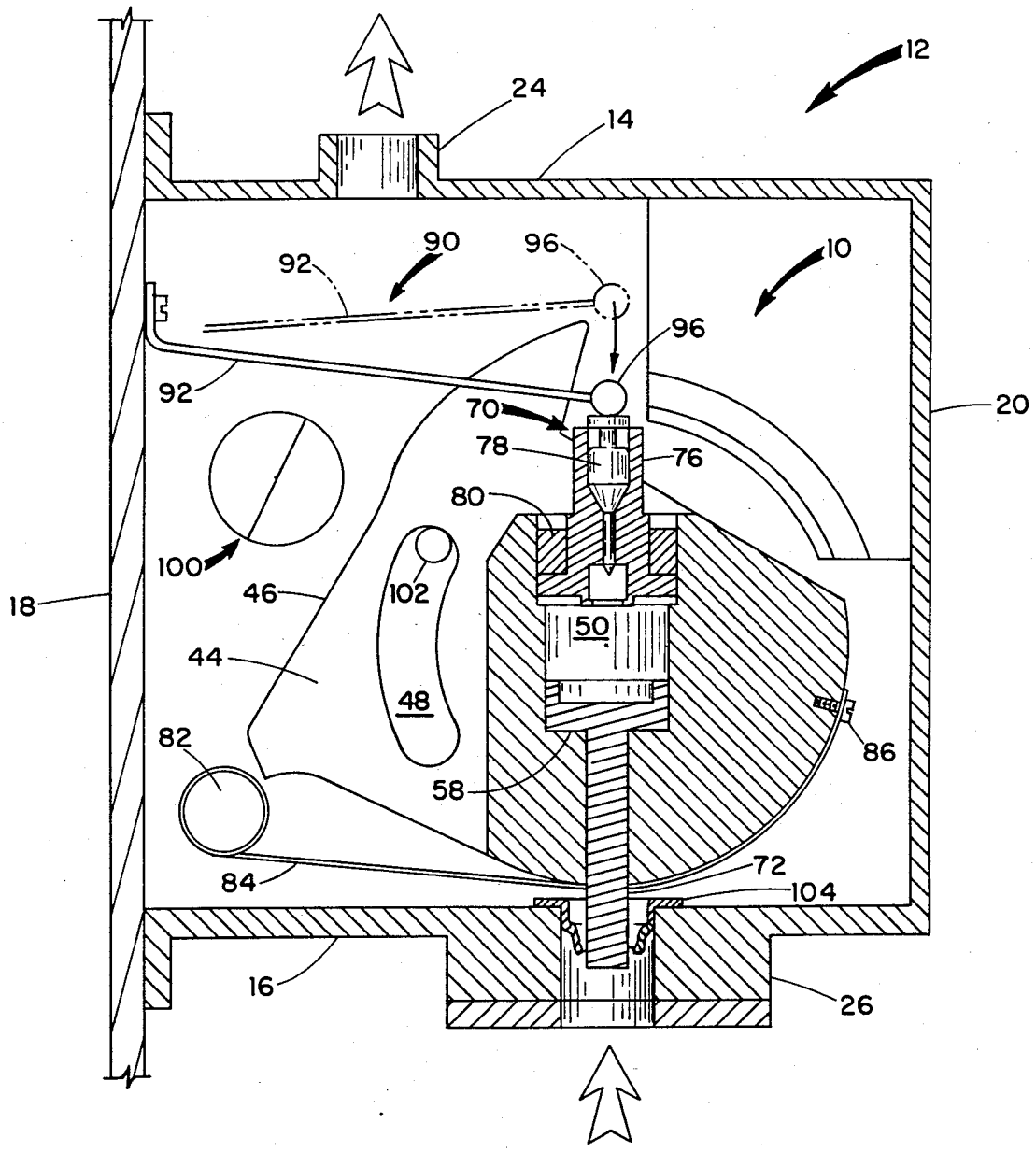
FIG. 3 is a cross-sectional view of the present invention after activation of the initiator assembly.

During counterclockwise rotation of the rotor member 40, the spring arm member 92 of the striker assembly 90 is caused to assume the position indicated by the dotted lines in FIG. 3, whereat the roller members 96 reaches the topmost position on the cam surfaces 46 whereat the wall portions 44 end thereby permitting the spring arm member 92 to move under spring compression in a clockwise direction downwardly and cause the striker member 98 thereof to contact the firing pin member 78 of the explosive assembly 70. The force of such downward movement on the firing pin member 78 causes the firing pin member 78 to move inwardly within the firing pin guide 76 to a point to ignite the stab primer 74 with the resulting explosion forcing the drive piston 72 through the chamber 50 to a point where the drive piston 72 contacts the shoulder portion 58 concomitantly with the lower portion of the drive piston 72 to fracture a membrane 104 positioned on the conduit 26 thereby extablishing fluid flow between a source of compressed fluid or gas through the gas inlet conduit 26 to the gas outlet conduit 24 via the housing 12.

While the invention herein has been described in connection with an exemplary embodiment thereof, it will be understood that many modifications will be apparent to those of ordinary skill in the art and that this application is intended to cover any adaptations or variations thereof.

What is claimed is:

1. In a missile system including a missile having user equipment powered by a compressed fluid, an assembly for passing compressed fluid to said user equipment from a source thereof, which comprises:

a housing having a gas inlet conduit means and a gas outlet conduit means, said gas outlet means being in fluid communication with said user equipment, one of said conduit means provided with a closure element;

a rotor member journalled for rotation in said housing, said rotor member formed of a mass of an eccentric weight distribution with respect to the axis of rotation of said rotor member;

an explosive assembly disposed in said chamber including a drive piston; and a striking assembly means for activating said explosive assembly in a preselect position to cause said drive piston to fracture said closure element.

2. The assembly as defined in claim 1 and further including locking means for preventing rotation of said rotor member during storage of said missile.

3. The assembly as defined in claim 1 and further including means for limiting rotation of said rotor member to a position whereupon said striking assembly means activates said explosive assembly after launching of said missile system.

4. The assembly as defined in claim 1 and further including spring means to control the rate of rotation of said rotor means after launching of said missile system.

5. The assembly as defined in claim 1 wherein said drive piston of said explosive assembly is not in alignment with said closure element during storage of said missile.

6. The assembly as defined in claim 1 wherein said explosive assembly includes a firing pin member positioned in a chamber thereof in spaced relationship to a primer material.

7. The assembly as defined in claim 1 wherein said drive piston is disposed in a chamber for limited movement therein after activation of said explosive assembly.

8. The assembly as defined in claim 1 wherein said rotor member is formed with a cammed surface.

9. The assembly as defined in claim 8 wherein said striking assembly includes a spring member and a striker member and wherein said spring member is placed under compression during rotation of said rotor member after launching of said missile system by contacting said spring member with said cammed surface of said rotor member.

10. The assembly as defined in claim 9 wherein said cammed surface terminates at a point prior to alignment of said striker member with said explosive assembly.

* * * * *